United States Patent [19]

Hatono et al.

[11] Patent Number: 4,580,449

[45] Date of Patent: Apr. 8, 1986

[54] METHOD AND APPARATUS FOR DETERMINING THE SURFACE LEVEL OF MOLTEN METAL

[75] Inventors: Akio Hatono; Sumio Kobayashi, both of Amagasaki, Japan

[73] Assignee: Sumitomo Metal Industries, Ltd., Osaka, Japan

[21] Appl. No.: 471,233

[22] Filed: Mar. 2, 1983

[30] Foreign Application Priority Data

Mar. 3, 1982 [JP] Japan ................... 57-33365

[51] Int. Cl.[4] ............... G01F 23/00; G01N 21/00
[52] U.S. Cl. .................. 73/290 R; 374/54; 356/355; 343/720; 324/58.5 B
[58] Field of Search ............... 374/121, 122, 54; 324/58 A, 58.5 A, 58.5 B; 356/354–356; 343/703, 720, 351; 250/357.1, 358.1; 343/453, 458; 73/290 R, 293, 295

[56] References Cited

U.S. PATENT DOCUMENTS

| | | | |
|---|---|---|---|
| 3,325,644 | 6/1967 | Frye et al. | 343/351 |
| 4,160,168 | 7/1979 | Funck | 250/564 |
| 4,347,515 | 8/1982 | Hoover et al. | 343/351 |

FOREIGN PATENT DOCUMENTS 197801  1/1969  Fed. Rep. of Germany ...... 374/121

119813  9/1981  Japan .................. 73/290 R

OTHER PUBLICATIONS

"Manual of Remote Sensing", *American Society of Photogrammetry*, 1975, vol. 1 and 2, pp. 516–527.
Hach, Joham-Peter, "A Very Sensitive Airborne Microwave Radiometer Using Two Reference Temperatures", *IEEE Transactions on Microwave Theory and Techniques*, vol. T-16, No. 9, Sep. 1968.

*Primary Examiner*—Charles Frankfort
*Assistant Examiner*—W. Morris Worth
*Attorney, Agent, or Firm*—Burns, Doane, Swecker and Mathis

[57] ABSTRACT

A method for detecting the surface level of a molten metal, particularly in a continuous casting process, utilizes the thermal radiations emanating from the surface of the metal. An antenna is directed so that its beam width encompasses a portion of the surface of the metal and the adjacent inner wall of the mold or container. The interference between radiations that propagate directly to the antenna from the surface of the metal and those that are reflected off the container wall is measured in terms of its electric power, i.e., the electromagnetic component of the radiations. Fluctuations in the measured electric power are indicative of changes in the level of the metal.

13 Claims, 8 Drawing Figures

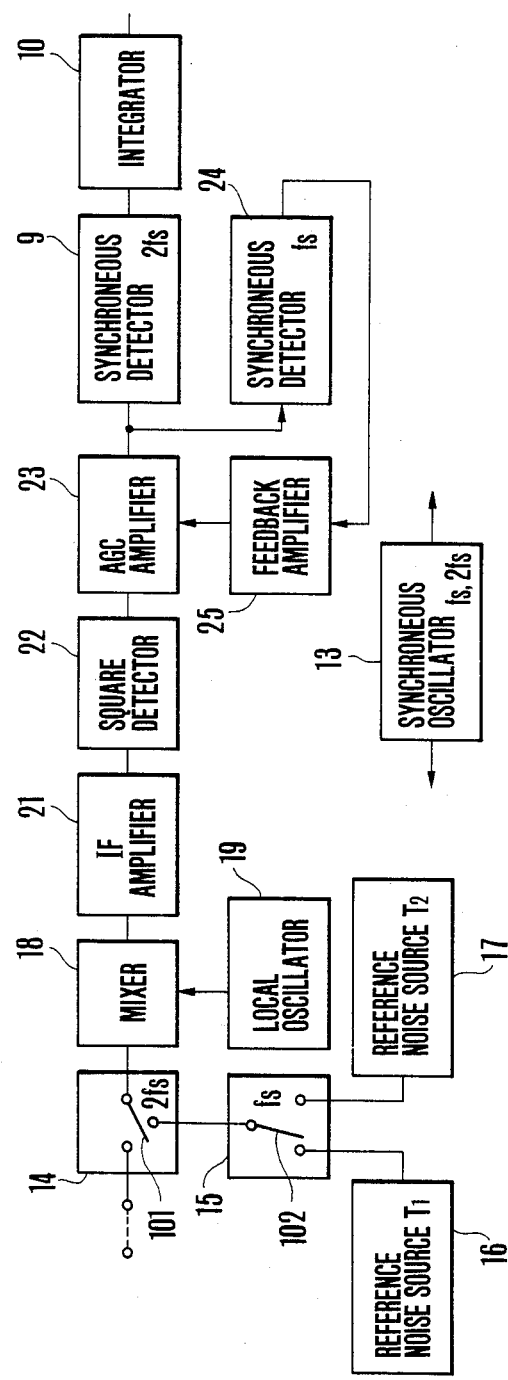
F I G. 5
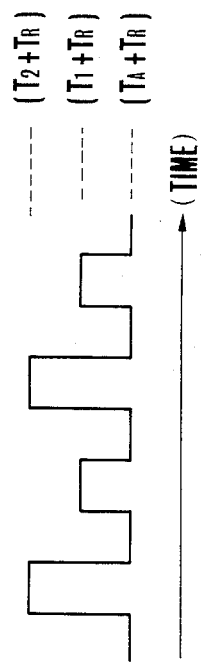
F I G. 6

METHOD AND APPARATUS FOR DETERMINING THE SURFACE LEVEL OF MOLTEN METAL

BACKGROUND OF THE INVENTION

The present invention relates to a method of determining the surface level of molten metal and to an apparatus therefor.

More particularly, the present invention relates to a method and apparatus which are suitably employed for determining the surface level of molten steel in the mold of continuous casting machine.

In the continuous casting method of steel, it is important to accurately measure the surface level of molten steel in a mold for controlling the teeming rate of molten steel from a tundish into the mold as well as for controlling the drawing speed of an ingot from the mold.

Varieties of measuring methods have hitherto been disclosed as the method of measuring the surface level of molten steel in a continuous casting mold. The representative examples include (1) the RI method, (2) the thermocouple method, (3) the eddy-current method, (4) the optical measuring method, (5) the infrared-camera measuring method and (6) the electrode immersion method. These methods, however, suffer from various problems as follows, respectively:

(1) The RI method requires a control for the security of operators and thus this method is now being replaced by other methods.

(2) The thermocouple method is an indirect and spot-type measuring method, and therefore, it has a poor responsiveness and accuracy.

(3) The eddy-current method is more excellent in accuracy and responsiveness than other methods, but this method requires to dispose a sensor close to the surface of molten steel. Moreover, in case of carrying out electromagnetic stirring of steel in the mold, the method is affected adversely by the generated magnetic field.

(4), (5) The optical measuring method and the infrared-camera measuring method are affected by fluctuations in thickness of the powder layer when powder is added onto the molten steel surface as a molten steel oxidation inhibitor or a lubricant.

(6) The electrode immersion method is a contact-type measuring method. Therefore, it may have interference with other equipment as well as is poor in operability.

SUMMARY OF THE INVENTION

It is, therefore, an object of the present invention to propose a method of determining the surface level of molten metal, which is excellent in safety, responsiveness and measuring accuracy, and capable of non-contact measurement of the surface level of molten steel surface in a mold in continuous casting without being affected by fluctuations in thickness of the powder layer in case of addition of powder onto the molten metal surface as well as without being affected by magnetic field in case of carrying out electromagnetic agitation in the mold, thereby coping with the above-mentioned problems of the conventional measuring methods.

According to the present invention, there is provided a method of determining the surface level of molten steel in a container, said method comprising the steps of:

directing an antenna to cover said molten metal surface and the inner wall of said container thereby to receive thermal radiations therefrom;

measuring in terms of electric power the interference between said thermal radiations;

computing the change in the surface level in terms of the fluctuations in the electric power, whereby the surface level is determined from the change therein.

According to the present invention, it is preferred to detect the electric power of thermal radiations having wavelength longer than about 0.4 mm. It means that, in the method of the present invention, it is essential to detect the thermal radiations interfering with that reflected by the inner wall of the container, and thus the thermal radiations should undergo a substantially total reflection on the container's wall. In considering the roughness of the wall of the usual continuous casting mold made of cupper and the like, it is preferred to detect only the thermal radiations of wavelength longer than about 0.4 mm.

According to an embodiment of the present invention, the method further comprises a step of: previously determining the relationship between the fluctuations in the electric power of the interfering thermal radiations and the change in the surface level of the molten metal, the surface level of the molten metal being determined by the measured electric power on the basis of said relationship. Otherwise, one may previously obtain a formula representing said relationship and determine the surface level of molten metal from this formula.

According to a still further embodiment of the present invention, there is provided an apparatus for determining the level of the surface of molten metal in a container, said apparatus comprising:

an antenna disposed to cover within the beam width thereof a part of said molten metal surface and a part of the inner wall of said container thereby to receive the interference between the thermal heat radiations coming directly from the metal surface and those reflected on the inner wall of the container;

an electric power meter being connected with said antenna and for measuring in terms of electric power the interference of thermal radiations received by said antenna; and means for computing the level of the molten metal surface from the measured electric power.

According to a preferred embodiment of the present invention, the electric power meter is a radiometer of Dicke's type.

According to another preferred embodiment of the present invention, the radiometer comprises a clock means, an amplifier, a switching means for connecting the antenna with said amplifier in synchronism with said clock means, a detecting means, a synchronous detector for detecting the output of said detecting means in synchronism with said clock means, and an integrator connected to the output of said synchronous detector.

According to a still further preferred embodiment of the present invention, said radiometer further comprises a local oscillator and a mixer for mixing the output of said switching means with the output of said local oscillator to produce an output of an intermediate frequency.

According a feature of the present invention, the radiometer further comprises a noise source means connected to said switching means, said switching means being adapted to alternatively connect with the input of said mixer the noise source and the antenna in synchronism with said clock means.

The noise source means may comprise a first and second noise sources which are alternatively connected at a predetermined frequency to the input of said switching means, and the radiometer further includes a feedback loop constituted by a second synchronous detector for detecting the output of preamplifying section of the radiometer and an amplifier adapted to feed a calibration signal back to the preamplifying section to make the output from said second synchronous detector constant.

BRIEF DESCRIPTION OF THE INVENTION

The other objects, features and advantages of the present invention will be more clear from the following detailed description of the present invention which is made in conjunction with the accompanied drawings.

FIG. 1 schematically illustrates the principle of the present invention.

FIG. 5 is a block diagram of a radiometer used according to a preferred embodiment of the present invention.

FIG. 6 schematically illustrates the wave form in the radiometer shown in FIG. 5.

Figure 7:
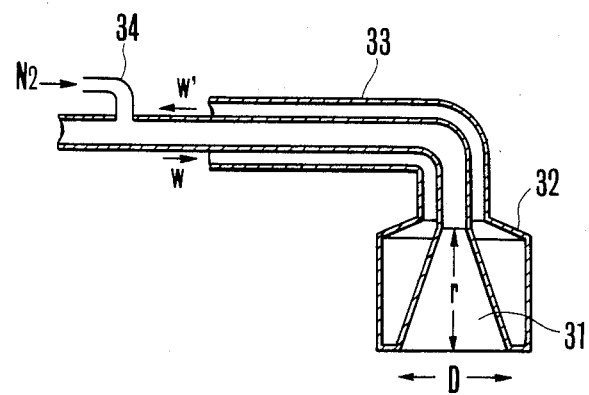

FIG. 7 shows in section an antenna which is preferably used according to the present invention.

Figure 8:
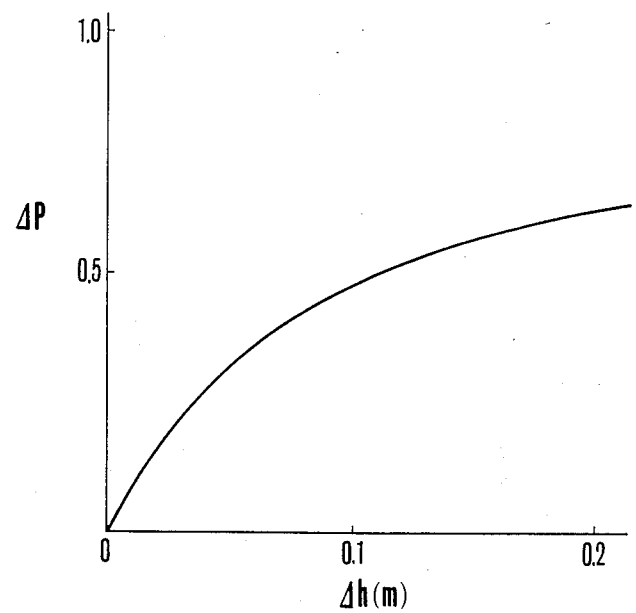

FIG. 8 is a graphic illustration of the result of a measurement according to the example of the present invention.

PREFERRED EMBODIMENT OF THE INVENTION

Figure 1:
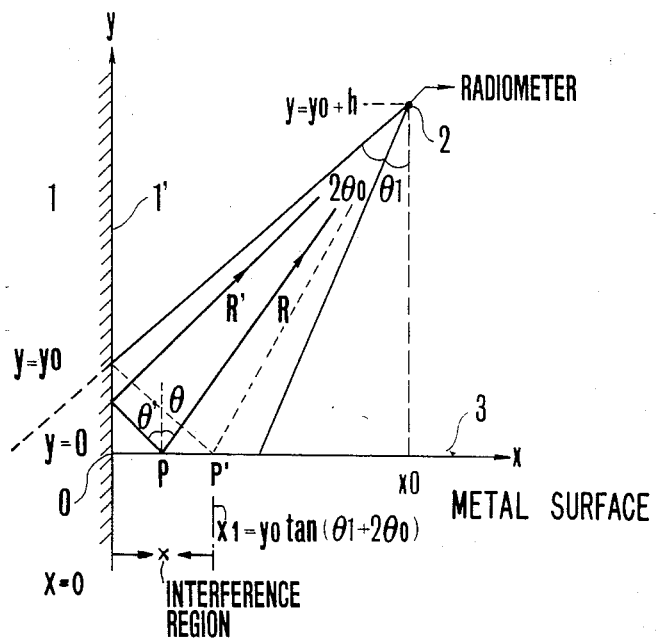

Now referring to FIG. 1 which schematically illustrates the principle of the present invention, an antenna 2 is disposed in a mold 1 of a continuous casting machine, so that the inner surface 1' of the mold 1 and the molten steel surface 3 are within the beam width of the antenna 2.

As explained hereinafter in more detail, it is essential to the present invention to dispose the antenna 2, of which the range of the beam width includes a part of the wall surface 1 and a part of the molten steel surface 3. Under these conditions, the thermal radiations, for example, coming from a point P of the steel surface, propagate directly towards the antenna 2 and also propagate towards the inner wall 1' and are reflected thereon toward the antenna. These thermal radiations are interfering with each other and then received by the antenna 2.

We, the inventors, discovered that the level of the molten steel surface 3 can be determined by measuring in terms of electric power the fluctuations in the interfering thermal radiations.

In order to obtain an accurate measurement of the thermal radiations, the thermal radiations should not be scattered on the inner surface 1' of the mold 1. It is preferred that a substantially total reflection is made on the inner surface 1'. It is, therefore, preferable to measure the thermal radiations having wavelength wider than about 0.4 mm in view of the roughness of the mold wall 1'.

In the model of two dimensions shown in FIG. 1, provided that the molten steel surface 3 and the inner wall surface 1' of the mold constitute x - y axis and that the antenna 2 is positioned at a height of $y = Y_0 + h$ and has a range of beam width of $2\theta_0$, the point $P(x_1, 0)$ included in the interference region $\overline{OP'}$ on the molten steel surface 3 can be represented as follows:

$$x_1 = y_0 \tan(\theta_1 + 2\theta_0)$$

Figure 2:
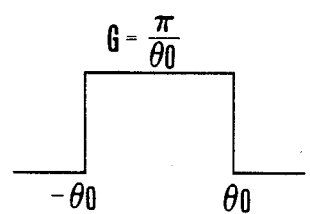
FIG. 2 shows in two dimensions an example of the beam width of the antenna which is used according to the present invention.

Now, the electric power of the interfing thermal radiations which are propagated from the point P at an angle $\theta$ to the antenna 2 will be calculated with the following assumptions:

(1) The antenna 2 has a beam width area of two dimensional range as shown in FIG. 2. That is, for calculation of the electric power of the thermal radiation, it is assumed that the antenna 2 has a directivity such that the gain is very large within the range of $\pm\theta_0$ and is very low outside of the range $\pm\theta_0$.

(2) The thermal radiations propagate on geometrically optic paths. That is, the thermal radiation propagates along a straight path, similarly to an optical ray.

(3) The thermal radiations emitted from different points do not interfere with each other.

The electric power of the thermal radiations emitted from the non-interference region $x \sim x + dx$ can be represented as follows:

$$dP = \frac{1}{2\pi} G(\theta) \epsilon(\theta) k \, TB \frac{\cos \theta}{R} d\chi \quad (1)$$

Wherein $G(\theta)$ is the electric gain of the antenna 2, $\epsilon(\theta)$ is the emissivity from the point P along the path to the antenna $\theta$, R is the distance to the antenna 2, k is the Boltsmann's constant ($1.38 \times 10^{-23}$ J/K), T is the physical temperature (K) of the steel surface, and B is the frequency band width (Hz) measured by the radiometer.

On the other hand, the thermal radiations from the point P propagate through paths from point P directly to the antenna and from the wall surface 1' to the antenna, and are. interfering with each other. These thermal radiations can be represented respectively as follows:

$$dP = \frac{1}{2\pi} G(\theta) \epsilon(\theta) k \, TB \frac{\cos \theta}{R} d\chi$$

$$dP' = \frac{1}{2\pi} G(\theta') \epsilon(\theta') k \, TB \frac{\cos \theta'}{R'} d\chi$$

The signal representing the electric power of thermal radiation received by the antenna 2 is calculated as follows:

$$dP = \left| \sqrt{dP} - \sqrt{dP'} \exp(-j\beta(R' - R)) \right|^2 \quad (3)$$

$$= dP + dP' - 2\sqrt{dP} \sqrt{dP'} \cos(\beta(R - R'))$$

Furthermore, assume that there is a relationship $G(\theta)=G(\theta')=\pi/\theta_0$, in the beam width of the antenna, the temperature of the antenna is given as follows:

$$T_A = \frac{1}{kB} \int_{\theta_1}^{\theta_1 + 2\theta_0} dP \qquad (3')$$

$$= \frac{1}{kB} \int_{\theta_1}^{\theta_1 + 2\theta_0} dP -$$

$$\frac{1}{kB} \int_0^{y_0 \tan(\theta_1 + 2\theta_0)} 2\, dP\, dP'\, \cos(\beta\Delta R)$$

$$= \frac{T}{kB} \int_{\theta_1}^{\theta_1 + 2\theta_0} \epsilon(\theta) d\theta -$$

$$\frac{T}{\theta_0} \int_0^{y_0 \tan(\theta_1 + 2\theta_0)} \cos(\beta\Delta R) \sqrt{\epsilon(\theta)\epsilon(\theta') \cdot \frac{\cos\theta\cos\theta}{RR'}}\, dx$$

where $\Delta R = R - R'$

Here, by putting the relationships $\epsilon(\theta)=\epsilon_0 \cos\theta$ and $\phi=\theta_1+\theta_0$ in the above formula, one obtains the following results:

$$T_A = \epsilon_0 T \frac{\sin\theta_0}{\theta_0} \cos\psi - \qquad (4)$$

$$\frac{\epsilon_0 T}{\theta_0} \int_0^{y_0 \tan(\psi + \theta_0)} \cos(\beta\Delta R) \frac{(y_0 + h)^2}{\sqrt{R^3 R'^3}} \cdot dx$$

R' is the distance that radiation travels from inner surface 1' to the antenna 2 when reflected from Point P; and E₀ is the emissitivity of the molten metal in the direction perpendicular to the surface of the molten metal.

As the first term of the formula (4) does not include a parameter depending on the variation in the surface level of molten steel, and thus the second term should be considered to determine the change in the surface level. Thus, the ratio $\Delta T_A^*$ of the first and second terms of the formula (4) is calculated as follows:

$$\Delta T_A^* = \frac{1}{\sin\theta_0 \cos\phi} \int_0^{y_0 \tan(\phi + \theta_0)} \cos(\beta\Delta R) \frac{(y_0+h)^2}{\sqrt{R^3 R'^3}}\, dx \qquad (5)$$

wherein $\tan(\phi+\theta_0)=x_0/h$,
$R^2=(x-x_0)^2+(y_0+h)^2$, and
$R'^2=(x+x_0)^2+(y_0+h)^2$.

The ratio $\Delta T_A^*$ of the formula (5) should be calculated by numerical integration, but it is too complicate and thus the ratio $\Delta T_A^*$ is here calculated by approximation.

As the angle $\theta_0$ is small in case of $\phi=0$, one can make an approximation of $(x\pm x_0)<<(y_0+h)$. Thus, the following approximation can be made:

$$R \simeq (y_0 + h)\left(1 + \frac{(x - x_0)^2}{2(y_0 + h)^2}\right),$$

-continued $$R' \simeq (y_0 + h)\left(1 + \frac{(x + x_0)^2}{2(y_0 + h)^2}\right),$$

With these approximations, the ratio $\Delta T_A^*$ can be represented as follows:

$$\Delta T_A^* \simeq \frac{1}{\theta_0(y_0 + h)} \int_0^{y_0\theta_0} \cos\left[\frac{2\beta x_0 x}{y_0 + h}\right] dx \qquad (6)$$

$$= \frac{1}{2\beta x_0 \theta_0} \sin\left(\frac{2\beta x_0 y_0 \theta_0}{y_0 + h}\right)$$

$$\simeq \frac{\lambda}{4\pi} \cdot \frac{1}{h\theta_0^2} \sin\left(\frac{4\pi}{\lambda} \cdot h\theta_0^2 \cdot \frac{y_0}{y_0 + h}\right)$$

Wherein $x_0$ and $\beta$ are calculated as $x_0 \simeq h\theta_0$, $\beta = 2\pi/\lambda$.

Figure 3:
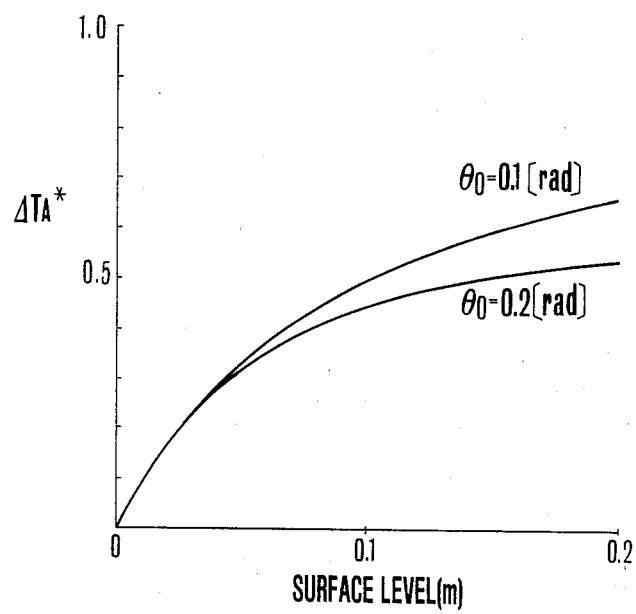
FIG. 3 is a graphic illustration of a relationship between the change in the surface level of molten steel and the fluctuations in the temperature of the antenna, which is calculated according to one embodiment of the present invention.

The ratio $\Delta T_A^*$ is calculated with values $\lambda=0.03$ (m) and $h=0.1$ (m), and the result is illustrated in FIG. 3. As shown in FIG. 3, the variation in $\Delta T_A^*$ is sufficiently large to continuously determine the change in the surface level therefrom.

Accordingly, it is practically possible to determine the surface level of molten steel by measuring the electric power received by the antenna 2.

However, as the received electric power of the antenna 2 is as low as $10^{-12}$ to $10^{-14}$w, it is preferred to use a high-sensitivity receiver such as radiometer.

Figure 4:
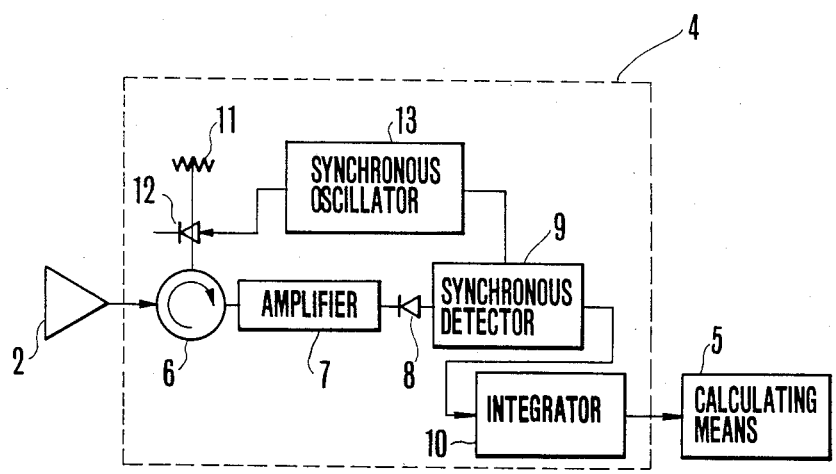
FIG. 4 is a block diagram of a radiometer used according to one embodiment of the present invention.

Now referring to FIG. 4, the apparatus for determining the surface level of molten metal comprises an antenna 2, a radiometer of Dicke's type 4 and calculating means 5. The radiometer 4 includes a high-frequency amplifier 7 connected through a circulator 6, a detector connected to the output of the amplifier 7, a synchronous detector 9 and an integrator 10 for integrating the detected power for a certain time duration.

The radiometer 4 further includes a diode switch 12 connected to the circulator 6 and to a dummy-load 11, and a synchronous oscillator 13 of a predetermined frequency, for example, of 1 KHz and for operating with said frequency the diode switch 12 and the synchronous detector 9.

The operation of the radiometer 4 shown in FIG. 4 is as follows:

The signal representing the electric power of thermal radiations is inputted through the circulator 6 to the diode switch 12. When the diode switch 12 is energized by the synchronous signal from the synchronous oscillator 13, the thermal radiation signal is absorbed by the dummy load. Thus, the amplifier 7 does not receive the signal from the antenna 2 and then the detector 8 detects an electric power corresponding to the temperature of the radiometer 4 itself. On the other hand, when the diode switch 12 is deenergized according to the synchronous frequency of the oscillator 13, the thermal radiation signal is reflected by the diode switch 12 and further inputted to the amplifier 7 through the circulator 6.

Accordingly, the synchronous detector 9 receives alternatively the temperature signal of the antenna 2 and the reference signal corresponding to the temperature of the radiometer itself and detects them in synchronism with the frequency of the synchronous oscillator 13 to detect the temperature signal of the antenna 2. The thus detected signal is then integrated by the integrator 10. In order to calibrate the Dicke radiometer and calculating means 5, measurements of $T_A$ are taken at different surface levels of the molten metal by, for example, dipping a probe into the molten metal to determine the surface level of the molten metal. The graph of FIG. 3 illustrates how the signal $T_A$ measured by the radiometer varies as the surface level of the molten metal varies. FIG. 8 illustrates the relationship between the change, $\Delta P$, in the measured value of the radiometer and the change $\Delta h$, in the level of the molten surface being measured by a means such as a probe for calibration purposes. The graph of FIG. 8 is analogous to that of FIG. 3. Of course, once the radiometer and calculating means have been calibrated, the calculating means can directly determine the surface level of the molten metal by use of the formula (6), mentioned above.

FIG. 5 is a block diagram of a radiometer of Dicke's type which is preferably employed according to the present invention. In FIG. 5, the parts corresponding to those in FIG. 4 are represented with the same reference numerals.

The radiometer shown in FIG. 5 includes a first switching means 14 having two inputs terminals of which one is connected to the antenna 2. The other input terminal of the first switching means 14 is connected through a second switching means 15 to reference noise sources 16 and 17. The operating terminals 101 of the first switching means 14 and 102 of the second switching means 15 are operated to change over respectively by frequencies 2fs and fs oscillated from a synchronous oscillator 13. The antenna signal $T_A$ is thus Dicke-modulated with two reference noise signals $T_1$ and $T_2$.

The radiometer further includes a mixer 18 connected to the output of the first switching means and for mixing the Dicke modulated signal with a determined frequency emitted from the local oscillator 19 to thereby convert it into a signal of an appropriate intermediate frequency. As shown in FIG. 5, the radiometer includes also an intermediate-frequency amplifier 21 and a square law detector 22. FIG. 6 shows schematically the waveform of the output of the square law detector 22.

The radiometer shown in FIG. 5 is characterized by further including a feedback loop which consists of an AGC amplifier 23 connected to the output of the square law detector 22, a second synchronous detector 24 and a feeback amlifier 25. In the present embodiment, the synchronous detector 9 operates in synchronism with a frequency 2fs. On the other hand, the second synchronous detector 24 operates in synchronism with a frequency fs thereby to detect a signal corresponding to the difference between the reference noise signals $T_1$ and $T_2$. The feedback amplifier 25 is connected to the output of the second synchronous detector 24 and is adapted to output a calibrate signal to the AGC amplifier 23 so as to maintain the output signal of the second synchronous detector 24 constant.

Accordingly, the fluctuations in gain of radiometer itself is compensated by means of AGC amplifier 23, which make possible a measurement with a high accuracy.

Referring now to FIG. 7, an example of the antenna which is preferably used according to the invention will be explained.

The circular horn antenna shown in FIG. 7 includes a casing 32 which defines therein an opening space 31 of frusto-conical form. The casing 32 is cooled by supplying water at a position indicated by an arrow W and withdrawing it at W', to maintain the antenna at a constant temperature. The opening space 32 is connected with waveguide 33 into which nitrogen is blown at 34 and dissipated from the opening 31 to prevent the dust from entering in the antenna.

As explained in the above, it is preferred to detect the thermal radiations of wavelength longer than about 0.4 mm. In order to limit the detected range of thermal radiation, the following relationship between the wavelength λ of thermal radiations to be received, the diameter D of the opening and the beam width $\theta$(rad) of the antenna should be considered.

$$\theta \approx \lambda/D \qquad (7)$$

Furthermore, the length of the horn of the antenna can be determined by the formula (8).

$$r \geq D^2/\lambda g \qquad (8)$$

Where λg: wavelength in the wave guide $$\lambda g = \frac{\lambda}{\sqrt{1 - \left(\frac{\lambda}{2a}\right)^2}}$$

with a being the length of the longer side of the section of waveguide

With these relationships, the antenna suited for the method and apparatus of the invention can be easily designed so as to receive the thermal radiations of wavelength longer than about 0.4 mm.

EXAMPLE

The measuring method according to the present invention was carried out under the following conditions.
Measuring Conditions:
  (a) wavelength: λ=30 mm (band width: 4 GHz)
  (b) antenna: circular horn antenna of 40 mm $\theta$ diameter
    beam width ($\theta$) of 0.1 rad
    observation angle ($\phi$) of 0 rad
  (c) normal distance (h) between the antenna and the molten steel surface: 0.1 m
  (d) electric power measuring device: the one shown in FIG. 4 was employed.
Measurement Objects:
  (a) curved mold for continuous casting steel slabs
  (b) mold inside dimension: 200 mm×1300 mm
  (c) addition of powder onto the molten steel surface The results of measurement carried out under the above conditions are shown in FIG. 8. Thus, it was able to obtain the change ($\Delta p$) in the received electric power corresponding to the change ($\Delta h$) in level of the molten steel surface.

As is obvious from the measurement results, it becomes possible to accurately measure the surface level of the molten steel without being affected by the powder since the thermal radiation from the powder is much weaker than that from the molten steel.

Thus, since the present invention is arranged as described above, the measuring method according to the present invention is excellent in safety and responsiveness and capable of accurate measurement independent of magnetic field due to the electromagnetic stirring in the mold. Accordingly, it is possible to efficiently carry out the continuous casting process control and the like. It is to be noted also that the measuring method and apparatus according to the present invention is well applicable to measurement of the level of molten metal surface in other molds besides the continuous casting mold.

What is claimed is:

1. A method of determining a surface level of molten metal in a container, said method comprising the steps of:

arranging an antenna above a surface of the molten metal focussing said antenna toward a point so that its beam width covers a predetermined area that includes a part of the surface of molten metal and a part of an inner wall of the container to receive thermal radiations of wavelengths longer than about 0.4 mm that emanate directly from said portion of said surface and that are reflected by said part of said inner wall;

measuring, in terms of electric power, interference between said thermal radiations having a wavelength greater than about 0.4 mm; and computing changes in the surface level in terms of fluctuations in the electric power, whereby the surface level is determined from the computation of such changes.

2. A method as claimed in claim 1, wherein the level of said molten metal surface is determined on the basis of a previously obtained relationship between the fluctuations of said electric power and changes in said level.

3. A method as claimed in claim 1, wherein said metal is a steel.

4. A method as claimed in claim 1, wherein said container is a mold of continuous casting machine.

5. An apparatus for determining a level of a surface of molten metal in a container, said apparatus comprising:

an antenna disposed to cover within a beam width thereof a part of said molten metal surface and a part of an inner wall of said container thereby to receive interference between thermal radiations coming directly from said part of the metal surface and those reflected on said part of the inner wall of the container;

an electric power meter being connected with said antenna and for measuring, in terms of electric power, the interference of thermal radiations having a wavelength longer than about 0.4 mm received by said antenna; and means for computing the level of the molten metal surface from the measured electric power.

6. An apparatus as claimed in claim 5, wherein said electric power meter is a radiometer.

7. An apparatus as claimed in claim 6, wherein said radiometer is of Dicke's type.

8. An apparatus as claimed in claim 7, wherein the radiometer comprises a clock means, an amplifier, a switching means for connecting the antenna with said amplifier in synchronism with said clock means, a detecting means, a synchronous detector for detecting an output of said detecting means in synchronism with said clock means, and an integrator connected to an output of said synchronous dectector.

9. An apparatus as claimed in claim 8, wherein said radiometer further comprises a local oscillator and a mixer for mixing an output of said switching means with an output of said local oscillator to produce an output of an intermediate frequency.

10. An apparatus as claimed in claim 9, wherein said radiometer further comprises a noise source means connected to said switching means, said switching means being adapted to alternatively connect with an input of said mixer the noise source and the antenna in synchronism with said clock means.

11. An apparatus as claimed in claim 10, said noise source means comprises a first and second noise sources which are alternatively connected at a predetermined frequency to an input of said switching means, and the radiometer further includes a feedback loop constituted by a second synchronous detector for detecting an output of preamplifying section of said radiometer and an amplifier adapted to feed a calibration signal back to the preamplifying section to make an output from said second synchronous detector constant.

12. An apparatus as claimed in claim 5, wherein the antenna is a horn antenna cooled by water.

13. An apparatus as claimed in claim 5, wherein the container is a mold of steel continuous casting machine.

* * * * *